July 16, 1957 R. W. SEYMOUR-LEE ET AL 2,799,842
GYROSCOPIC INSTRUMENTS
Filed Oct. 6, 1954 4 Sheets-Sheet 1
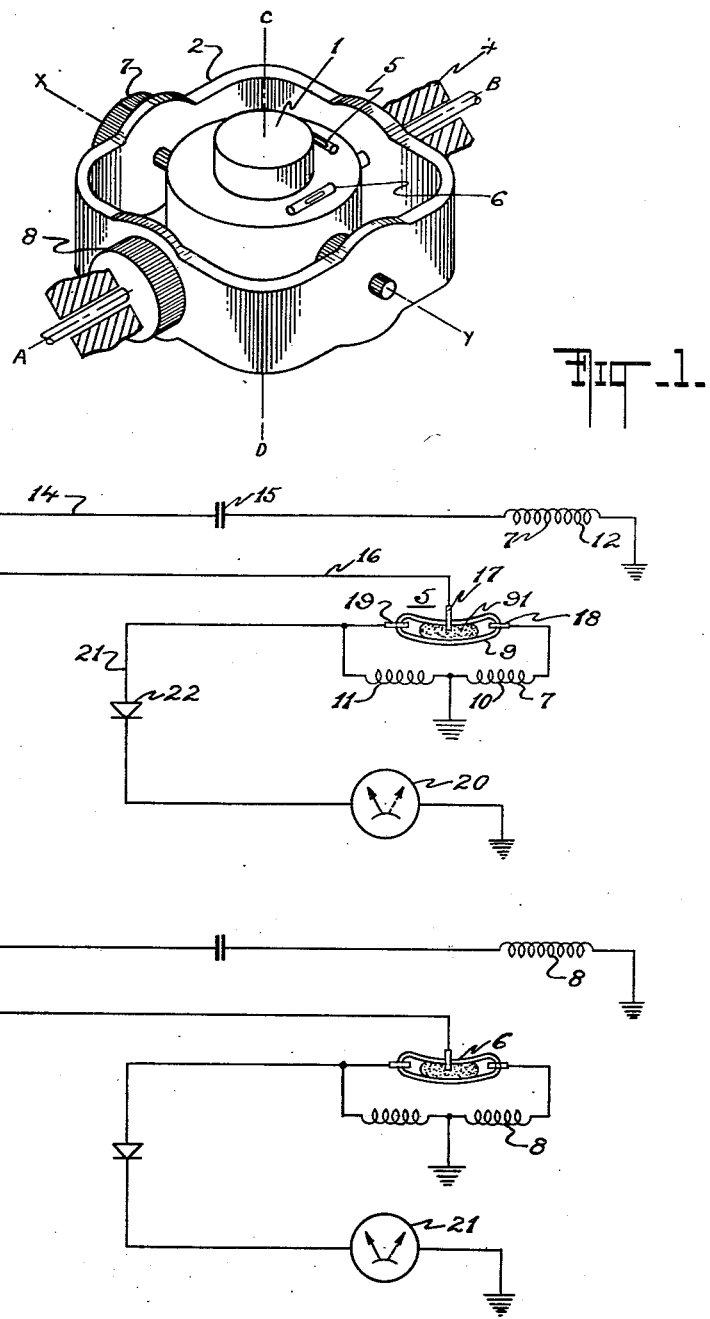
INVENTORS
ROGER WILLIAM SEYMOUR-LEE
FRANK DOVE
BY
Herbert H. Thompson
ATTORNEY

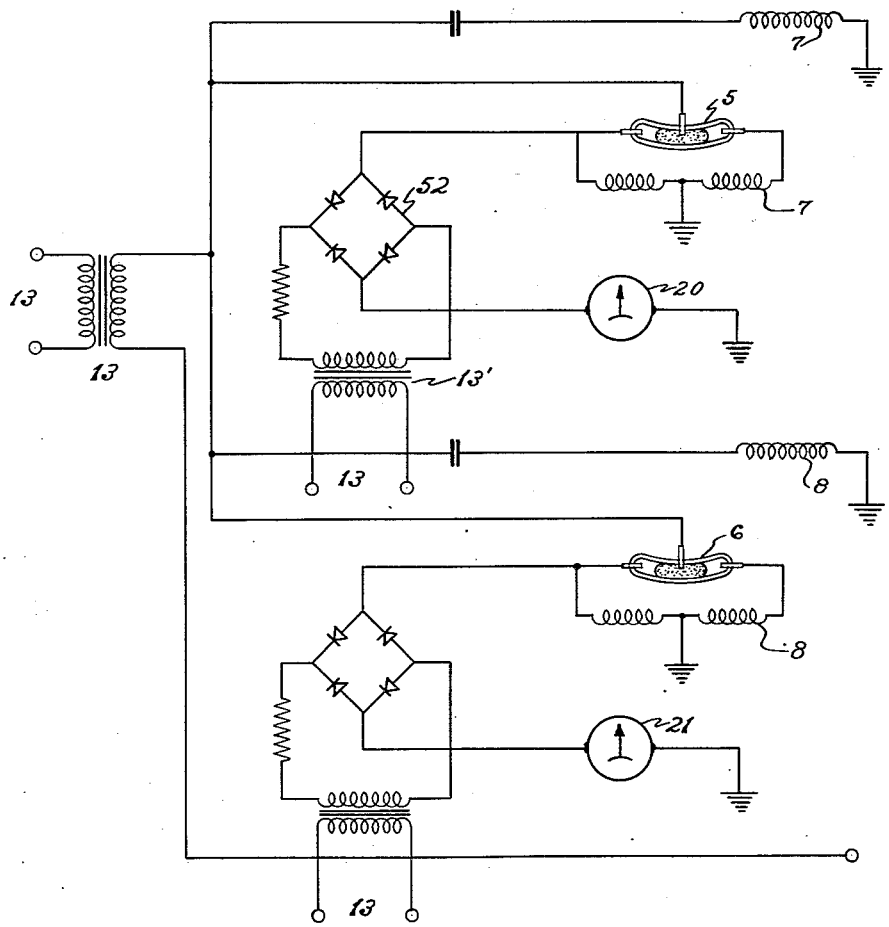

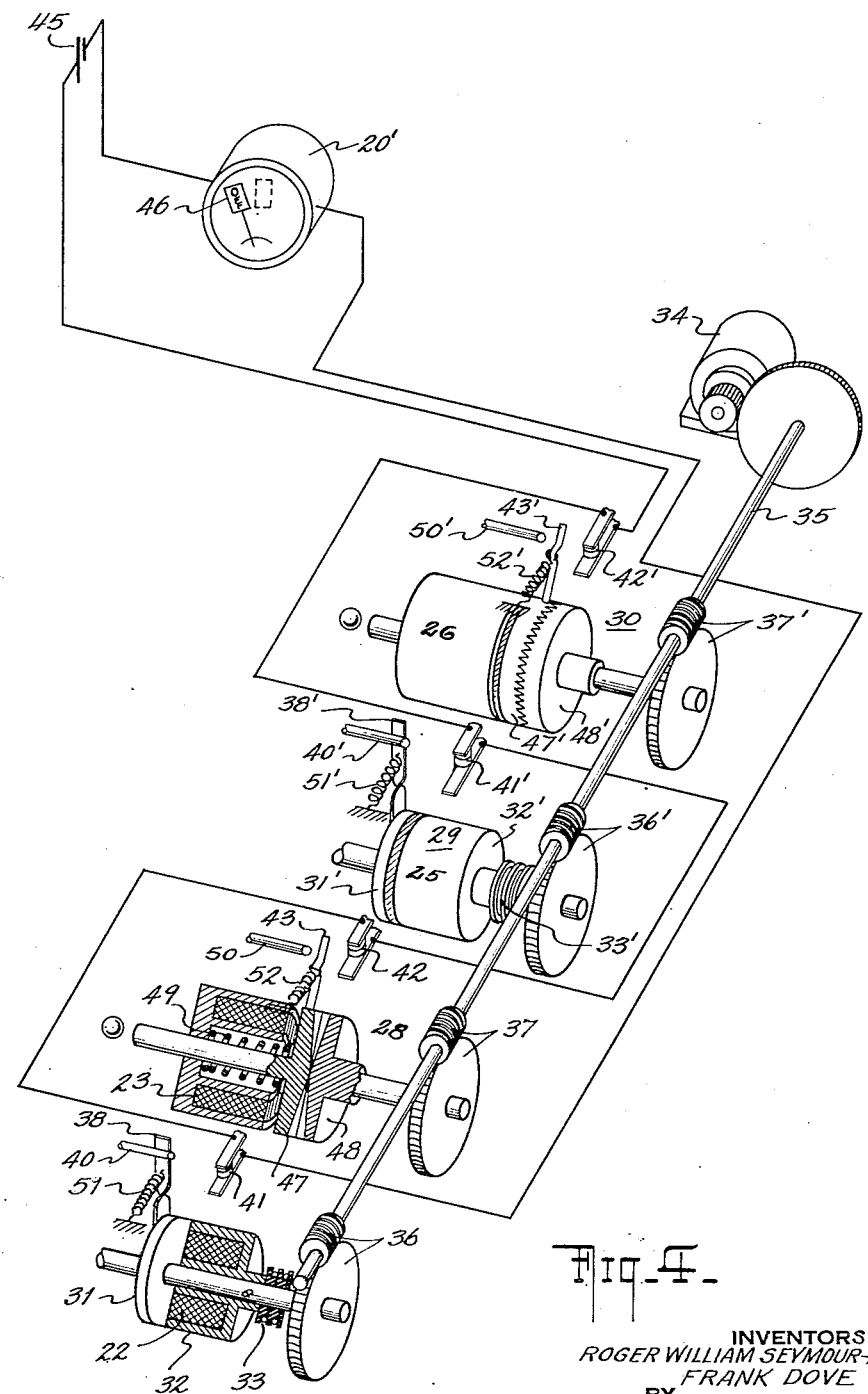

United States Patent Office 2,799,842
Patented July 16, 1957

2,799,842
GYROSCOPIC INSTRUMENTS

Roger William Seymour-Lee, West Molesey, and Frank Dove, St. Albans, England, assignors to The Sperry Gyroscope Company Limited, Brentford, England, a British company Application October 6, 1954, Serial No. 460,614

Claims priority, application Great Britain October 5, 1953

5 Claims. (Cl. 340—27)

This invention relates to gyro verticals of the kind in which a sensitive element, mounted with freedom of angular movement about two horizontal axes, is arranged to be controlled by a gravity-responsive tilt-detector with the detector arranged to detect tilt of the sensitive element from a reference position in which a reference line defined by the element is vertical, or lies along the apparent vertical, and to provide tilt signals defining the sense of departure of the reference line from the vertical, or apparent vertical, and in which the tilt signals from the tilt detector are used to control energisation of one or more torque-applying devices to effect the control of the gyro vertical.

One convenient form of gyro vertical comprises a rotor case pivotally mounted about a minor axis (the pitch axis) in a gimbal ring which is pivotally mounted about a major axis (the roll axis) in a housing, the major and minor axes being normally parallel to, or coincident with, the fore-and-aft and athwartships axes of the craft when the instrument is mounted in the craft and the rotor case being controlled, during operation, so that the rotor axis is maintained substantially at the vertical, or at a predetermined angle to the vertical, by the application of torques about the major and minor axes by a pair of torque motors under the control of a pair of tilt-detecting liquid-level devices mounted on the rotor case. Alternatively, the liquid-level device that detects tilt about the pitch axis may be mounted on the gimbal ring or a single liquid-level device that detects tilt about both the pitch and roll axes may be mounted on the rotor case. The liquid-level device may be a two-way mercury switch arranged to a close a first circuit, including a torque motor winding, when it is tilted by the sensitive element in one direction to cause the application of a torque in one sense about the appropriate axis and to close a second circuit, including the same torque motor winding, when it is tilted in the other direction to apply a torque in the opposite sense about the same axis.

In the absence of a gravity-responsive tilt-detector the spin axis of a gyroscope tends to maintain a set direction in space except in so far as disturbing torques tend to cause it to wander away from the set direction. In gyro verticals, however, it is desired that the spin axis shall maintain a set direction, not in space, but with reference to the rotating earth. Consequently in gyro verticals controlled from a gravity-responsive tilt-detector, it is required not only to overcome the effects of disturbing torques, but also to provide a reference with respect to earth axes. If the tilt-detector ceases to operate, a gyro vertical will soon cease to define a vertical reference. When gyro verticals are in use it is desirable that the pilot should know when the instrument is being controlled so that it does define a vertical reference.

According to the present invention there is provided a gyro vertical of the kind in which a sensitive element, mounted with freedom of angular movement about two horizontal axes, is arranged to be controlled by a gravity-responsive tilt-detector arranged to detect tilt of the sensitive element from a reference position in which a reference line defined by the element is vertical, or lies along the apparent vertical, and to provide tilt signals defining the sense of departure of the reference line from the vertical, or apparent vertical, and in which the tilt signals from the tilt detector are used to control energisation of one or more torque-applying devices to effect the control of the gyro vertical, characterised, by the provision of a warning device arranged to be controlled by the tilt signals from the tilt detector and, in response thereto, to provide a warning signal on the occurrence of abnormal values, or abnormal durations, of tilt signals, or an indication by which such occurrence may be recognised.

The advantage of the invention is that the pilot, or other observer of the instrument or its repeater, can judge whether the instrument is operating correctly. For example, in an instrument using on-off control, as in gyro verticals using mercury switches as tilt detectors, the warning device should be continuously reversing its indication as the gravity-responsive control is exercised first in one sense and then in the other. If this is not the case the pilot is warned that the instrument is probably functioning incorrectly. Even in a system using proportional control the pilot receives a similar warning if the warning indicator remains for too long a time on one side of the zero.

Embodiments of the invention will now be described with reference to the accompanying drawings in which:

Figure 1 is a schematic illustration of a gyro vertical for aircraft showing the location of the gravity-responsive controllers and the torque motors for the pitch and roll axes, the indicating arrangements for the gyro vertical being omitted.

Figure 2 is a wiring diagram of the connections between the controllers, the torque motors and an indicator in accorance with one form of the invention, and Figures 3 and 4 illustrate schematically a modified form of the invention.

Fig. 5 illustrates schematically a further embodiment.

Figure 3:
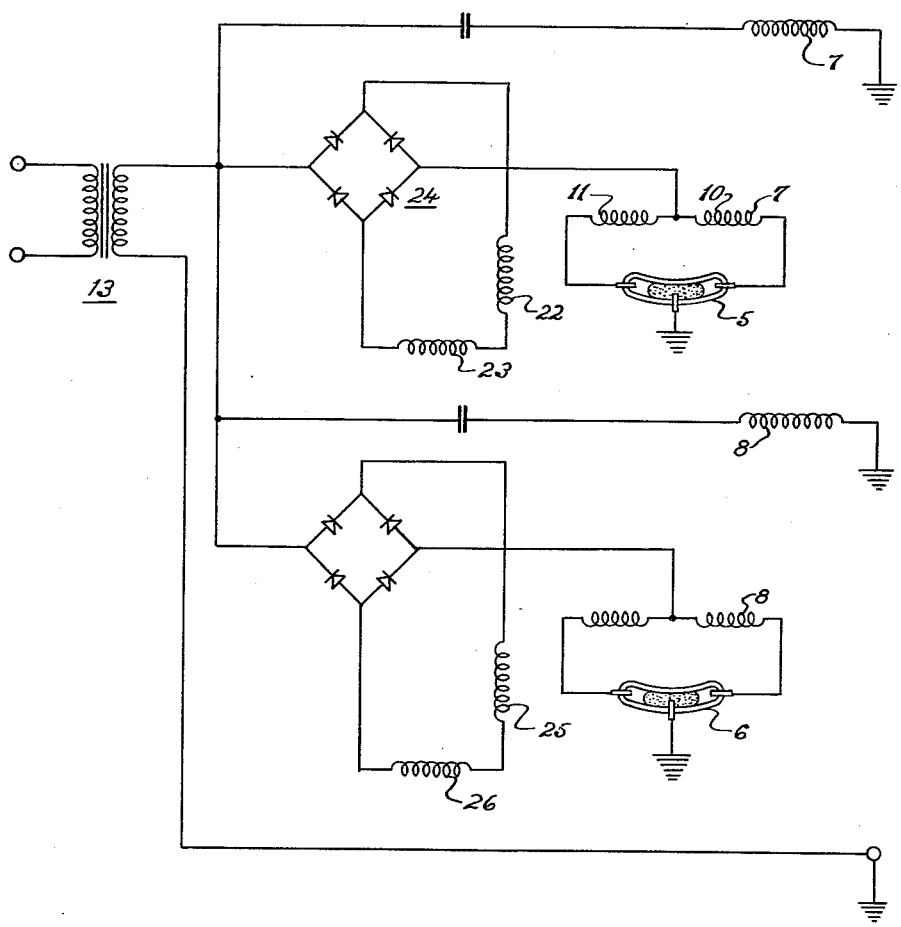

Referring to Figures 1 and 2 of the drawings the gyro vertical comprises a rotor bearing case 1 having a rotor (not shown) mounted for spinning about a normally vertical axis CD. The rotor case 1 is mounted with freedom of angular movement about an axis XY in a gimbal frame 2 which is itself pivotally mounted with freedom of angular movement about an axis AB in an instrument housing 4. The housing 4 is adapted for mounting on the instrument panel of an aircraft or in some other position of the aircraft depending on whether the indications to be provided by the gyro vertical are provided directly at a face of the instrument or by means of a repeater instrument to be mounted on the instrument panel and remotely controlled from the gyro vertical. Both methods of providing indications are well-known and need not be described here since they are not essential for an understanding of the present invention.

Normally the gyro vertical will be mounted in the aircraft with the axes AB and XY located in the fore-and-aft and athwartships directions respectively, and the gyro vertical will enable indications to be provided of the aircraft's attitude about its fore-and-aft and athwartships axes, namely, the pitch and roll axes, respectively.

The axis of the rotor of the gyro vertical is maintained vertical, or at a predetermined angle to the vertical, by a gravity-responsive erection device comprising two liquid level switches 5, 6 mounted on the rotor bearing case 1 and a pair of two-phase torque motors 7, 8 respectively connected to the liquid level switches 5, 6 as shown more clearly in Figure 2.

The liquid level switch 5 and torque motor 7 are effective in operation to erect the rotor case about the roll axis AB, and the liquid level switch 6 and torque motor 8 are effective in operation to erect the rotor case about the pitch axis XY. Figure 2 illustrates the connections of the erection device for both the pitch and roll axes from which it will be seen that the connections are identical for the two axes. Accordingly a description of that part of the erection system which is effective about the roll axis AB only will be given.

With reference to Figure 2, the liquid level switch 5 is shown schematically as comprising a mercury switch in the form of a container 9 containing a globule of mercury 9' and having three contacts 17, 18, 19 fixed to the container. The contact 17 is permanently connected through lead 16 to one side of a source of A. C. supply 13 whilst the other two contacts 18, 19 are connected to earth through the windings 10, 11 of the two-phase torque motor 7 respectively. Movement of the mercury 9' to the left as shown in the drawing will thus connect the contacts 17 and 19 and movement of the mercury to the right will connect the contacts 17 and 18. Thus, either the winding 10 or the winding 11 may be connected between earth and one side of the source of supply through the lead 16. A third winding 12 of the torque motor 7 is permanently connected between earth and the same side as the source supply through the lead 14 and a condenser 15 which serves to produce a 90° phase shift in the current applied to the winding 12. The other side of the source of supply is connected to earth. The two windings 10 and 11 are connected in opposition so that when one is energised the torque applied by the torque motor is in the opposite sense to the torque that is applied when the other winding is energised.

The operation of an erection device of this kind is well-known and need not be described in detail. It is sufficient to state here that if the rotor bearing case 1 tilts about the axis AB, the mercury 9' of the switch 5 will move to the lower side of the switch and will cause the energisation of one or other of the windings 10 or 11 of the torque motor 7. The interaction of the field produced due to the current in this winding with the field produced in the permanently energised winding 12 will cause the application of a torque to the gyroscope about the axis XY in the right sense to cause precession of the gyroscope about the axis AB to remove the tilt about that axis.

Similarly, for tilt of the rotor case 1 about the axis XY, the liquid level switch 6 becomes effective to energise the torque motor 8 to apply the necessary erecting torque to remove the tilt.

As has been stated it is desirable that the pilot, or other person observing the indications provided by the gyro vertical, should known that the gyro vertical is functioning properly, that is that the gyro rotor axis is maintained in its vertical position or in its predetermined relationship with the vertical. To this end there is provided an indicator 20 which provides an indication of the sense in which the control torques are acting about the axis XY. The indicator 20 is connected to the source 13 through the lead 16, the liquid level switch 5, lead 21 and the rectifier 22, the latter serving to produce direct current for operating the movable part of the indicator. The indicator 20 is of the kind whose movable part is spring-biased to one fixed position but which, when energised by the D. C. current, moves to another fixed position against the action of the spring.

In the gyro vertical, according to the present embodiment, if the erection device is functioning properly the indicator 20 should continuously reverse its indications, that is, the movable part should continuously flick from one position to the other as the mercury 9' moves to make one contact or the other and returns away from that contact on removal of that tilt. If the mercury 9' has moved so as to bridge one set of contacts and persists for some time in bridging these contacts, the indicator 20 will provide a continuous indication in one sense and thus will provide a warning to the pilot that the gyro vertical is not functioning properly and may have a large tilt in one direction or the other about the axis AB. The indicator 20 may be located in any position that is convenient for the observation by the pilot or other observer in the aircraft. For example, it may be mounted on the face of the instrument housing 4 particularly if that housing is mounted on the instrument panel. Alternatively, it may be mounted on the face of a repeater instrument controlled from the gyro vertical.

It will be appreciated that the erection controllers 5 and 6 need not be of the "on-off" kind described but may be of the kind that control the application of torques that are proportional to tilts of the rotor case in which case the indicators 20, 21, will also provide indications of the magnitude of the applied torques in addition to the sense of the applied torques.

It will be appreciated that it may be desirable in certain circumstances to provide a positive warning to the pilot, or other observer in the aircraft, that the gyro vertical is not functioning properly. Thus it may be desirable to provide an indicator which is only operated to indicate improper functioning of the gyro vertical when there has been a persistent torque-applying signal in one sense for some time. To this end the embodiment of Figures 3 and 4 is provided.

In Figure 3 there is shown a wiring diagram of the erection device for the pitch and roll axes of a gyro vertical substantially similar to that shown in Figure 2; no further description of the erection device need therefore be given here. In this embodiment there are provided windings 22, 23 for controlling the operation of the indicator. These are connected in series across the full wave rectifier 24 across which are also connected one side of the source of supply 13 and the torque motor windings 10, 11. The windings 22, 23 are thereby provided with D. C. signals whenever one or other of the windings 10 and 11 is energised from the source of supply, that is, whenever there is a tilt of the rotor case. When there is no tilt of the rotor case, neither of the windings 22, 23 is energised.

Similar considerations apply to the pitch axis control where the windings 25, 26 correspond to the windings 22, 23.

The windings 22, 23 and 25, 26 are used to control the operation of a warning indicator 20', Figure 4, in accordance with the invention. Referring to Figure 4 the winding 22 forms the energisation winding of an electromagnetic clutch 27 and the winding 23 forms the energisation winding of a dog clutch 28. The windings 25, 26 are not shown in Figure 4 but they form the energisation windings of two clutches 29, 30 which perform similar functions to the clutches 27, 28. The clutch 27 has two parts, clutch plate 31 and a clutch engaging part 32 which are urged out of engagement by a spring 33 when the winding 22 is de-energised. When the winding 22 is energised the two parts 31, 32 are brought into engagement by the electromagnetic action against the force of the spring; thus when there is no tilt of the gyroscope rotor case, the clutch parts 31, 32 will be separated from each other. Similar considerations apply to the clutch 29 which has two parts 31', 32' which are urged out of engagement by a spring 33' when the winding 23 is de-energised. When the winding 23 is energised, the two parts 31', 32' are brought into engagement by the electromagnetic action against the force of the spring 33'.

The dog clutch 28 has two parts 47, 48 which are urged into engagement by a spring 49 when the winding 23 is de-energised. When the winding 23 is energised, the two parts 47, 48 are forced apart by the electromagnetic action. Similarly, the dog clutch 30 comprises two parts 47', 48' which are urged into engagement by a spring (not shown) when the winding 26 is de-energised.

When the winding 26 is energised the two parts 47', 48' are forced apart by the electromagnetic action.

The clutch parts 32, 32' and 48, 48' are continuously driven very slowly by a constant speed motor 34 through the shaft 35 and gearing 36, 36', 37, 37'. Clutches 27, 29 are provided with contact breaking devices 38, 38' which are connected to be driven by the clutches against the action of springs 51, 51' when they are rotated by the motor 34 and away from the stops 40, 40'. If the contact breaking devices 38, 38' are rotated through a predetermined angle, say 60°, they serve to break switches 41, 41'. Clutches 28, 30 are provided with contact breaking devices 43, 43' which are connected to be driven by the clutches against the action of springs 52, 52', when they are rotated by the motor 34 away from the fixed stops 50, 50'. If the contact breaking devices 43, 43' are rotated through a predetermined angle, say 60°, they serve to break the switches 42, 42'.

All the switches 41, 41', 42, 42' are connected in series with a D. C. supply 45 and they are normally made so that the indicator 20 is energised and the "off" flag 46 of the indicator is concealed from view by the observer. If, however, the erection device is operating to provide an erection signal to, say, the torque motor 7 the winding 22 will be energised and the clutch parts 31, 32 of the clutch 27 will be brought into engagement with the result that the motor 34 will cause rotation of the clutch. The contact breaking device 38 will then be moved by the clutch away from the stop 40 towards the switch 41. If the torque motor winding remains energised, and with it the winding 22, for a sufficiently long time for the contact breaking device 38 to move through a sufficient distance to break the switch 41, the circuit including the indicator 20 will be broken and the "off" flag 46 will move into a position that is visible to the observer to indicate that the gyro vertical is not functioning properly. If the torque motor winding becomes de-energised before the contact breaking device 38 reaches the switch 41, the spring 51 will centralise the plate 31 and with it a contact breaking device 38 against the stop 40. Similarly, if the erecting device is operating to provide an erection signal to the torque motor 8 the winding 25 will be energised and the clutch parts 31, 32' will be brought into engagement with the result that the motor 34 will cause rotation of the clutch. The contact breaking device 38' will then be moved by the clutch away from the stop 40' towards the switch 41'. If the torque motor winding remains energised, and with it the winding 25, for a sufficiently long time for the contact breaking device 38' to move through a sufficient distance to break the switch 41' the circuit including the indicator 20 will be broken and the "off" flag 46 will move into a position that is visible to the observer. If the torque motor winding becomes de-energised before the contact breaking device 38 reaches the switch 41 the spring 51' will centralise the plate 51', and with it the contact breaking device 38', to the stop 40'.

If there were a failure in the supply lines including the windings 22 and 25 the clutch parts of the clutches 27, 29 would be disengaged due to the de-energisation of the windings 22, 25 and the system would fail to operate as a warning device since the switches 41, 41' would never be broken. Accordingly the clutches 28, 30 are provided to operate the warning indicator when there is a break in the supply. As will be seen, if there is a break in the supply one or both of the windings 23, 26 will be de-energised with the result that the circuit to the indicator 20' will be broken and the "off" flag rendered visible. If the rotor axis is vertical or in its predetermined position relative to the vertical the windings 23, 26 will be de-energised and the clutches 28, 30 will function to rotate the contact breaking devices towards the switches 42, 42'. However, the possibility of the gyro rotor remaining in the tilt free position for a sufficiently long time for the windings 23, 26 to be de-energised for the length of time required for the switches 42, 42' to be broken is negligible.

A further embodiment of the invention is illustrated in Fig. 5. In this embodiment the warning device is operated from the voltage developed on contact 19 of the mercury switch 5 as an input voltage. This voltage is applied to a centre-zero indicating meter 20 through a phase responsive network 52 which compares the phase of the input voltage with the phase of the reference voltage at the same frequency as the source of supply obtained through transformer 13'. The network consists of a bridge of four rectifiers as shown connected across the source of reference voltage 13' in series with a resistor, the input voltage from the contact 19 and the indicator 20 being connected in series across the other diagonal of the bridge. Because of the bridge connection the reference voltage supplies no current to the indicator 20' except when the bridge is influenced by an input voltage in which case D. C. is passed by the rectifiers in one direction or the other through the indicator 20' according to the phase agreement or disagreement between the input voltage and the reference voltage. The input voltage is of one phase when the contacts 17, 19 are made and of opposite phase when contacts 17, 18 are made due to the transformer action of the windings 10, 11.

Similar considerations apply to the arrangement including the mercury switch 6 and the warning indicator 21.

We claim:

1. A warning system for gyro verticals showing when the indications thereof may not be relied upon, the combination with the gyro vertical, a tilt detector therefor, means producing signals upon error between said gyro vertical and detector in either direction of tilt, said detector also being subject to acceleration forces, an erecting torquer controlled by said signals for exerting torques on the gyro in the proper sense to correct the error, a warning indicator also controlled by said signals, and selective means for operating said indicator from said signals only upon continuation of an error signal for a predetermined period.

2. In a warning device for gyro verticals, gravitationally responsive tilt detector means for generating signals therefrom upon relative tilt in one direction or the other of said gyro and detector, a reversible torquing device energized by said signals in the proper direction to erect the gyroscope upon relative tilt in either direction, a warning indicator for showing when the gyro may not be truly vertical, means for controlling said indicator after said signal energizes said torquing device, and means for delaying the operation of said indicator by said error signal to prevent operation of the same until said torquer has remained continuously operative for a predetermined period.

3. A warning system for gyro verticals showing when the indications thereof may not be relied upon, the combination with the gyro vertical, a tilt detector therefor, means producing signals upon error between said gyro vertical and detector in either direction of tilt, said detector also being subject to acceleration forces, an erecting torquer controlled by said signals for exerting torques on the gyro in the proper sense to correct the error, a warning indicator also controlled by said signals, selective means for operating said indicator from said signals only upon continuation of an error signal for a predetermined period, and means for also operating said warning indicator upon failure of the power supply to said torquer.

4. In a warning device for gyro verticals, gravitationally responsive tilt detector means for generating signals therefrom upon relative tilt in one direction or the other of said gyro and indicator, a reversible torquing device energized by said signals in the proper direction to erect the gyroscope upon relative tilt in either direction, a warning indicator for showing when the gyro may not be truly vertical, means for controlling said indicator after said signal energizes said torquing device, means for delaying the operation of said indicator by said error signal to prevent operation of the same until said torquer has remained continuously operative for a predetermined period, and means for also operating said warning indicator upon failure of said power supply to said torquer.

5. A warning device for gyro verticals as claimed in claim 1, in which the indicating operating means includes a motor adapted to be continuously driven in one direction, a switch opening member normally biased in an inoperative position, a slip friction clutch for connecting said member to said motor to slowly rotate the same, and magnetic means controlled by said error signal for closing said clutch whereby said switch is only opened after said clutch has remained closed for a predetermined period.

References Cited in the file of this patent

UNITED STATES PATENTS

| | | |
|---|---|---|
| 2,202,987 | Egenas | June 4, 1940 |
| 2,414,448 | Carter | Jan. 21, 1947 |
| 2,446,180 | Haskins | Aug. 3, 1948 |
| 2,745,091 | Leffler | May 8, 1956 |

FOREIGN PATENTS

| | | |
|---|---|---|
| 565,331 | France | Nov. 6, 1923 |